United States Patent Office 3,288,809
Patented Nov. 29, 1966

3,288,809
3-(1-PHENYL-2-PROPYNYL)-4-HYDROXYCOUMA-
RIN AND METHOD OF PREPARING THE SAME
Karl Ernst Schulte and Johannes Reisch, both of Munster,
Westphalia, Germany, assignors to W. Spitzner Arznei-
mittelfabrik G.m.b.H., Ettlingen, Baden, Germany, a
corporation of Germany
No Drawing. Filed May 28, 1964, Ser. No. 371,117
Claims priority, application Germany, June 5, 1963,
S 85,542
1 Claim. (Cl. 260—343.2)

This invention relates to 3-(1-phenyl-2-propynyl)-4-hydroxycoumarin, to a method of preparing the same, and to its hydrogenation to phenprocoumon.

3-(1-phenylalkyl)-4-hydroxycoumarin derivatives have valuable properties as anticoagulants for the prevention or inhibition of vascular clotting. They are commonly employed in the treatment of human vascular ailments. Phenprocoumon or 3-(1-phenylpropyl) - 4 - hydroxycoumarin has been clinically accepted under various trade names.

This invention is more particularly concerned with a novel method of preparing phenprocoumon and with an intermediate product obtained by the method.

We have found that 4-hydroxycoumarin may be reacted with phenylethynylcarbinol in the presence of phosphorus oxychloride in an inert solvent to produce 3-(1-phenyl-2-propynyl)-4-hydroxycoumarin in high yields, and that the triple bond of the intermediate compound may be hydrogenated to produce phenprocoumon with a yield of practically 100%.

The reaction between 4-hydroxycoumarin and phenylethynylcarbinol is preferably carried out in chloroform which boils at a temperature high enough to produce the desired intermediate compound relatively rapidly, and low enough to prevent polymerization and the formation of an excessive amount of by-products. The temperature at which the reaction is carried out is not critical, however, and other inert solvents may be employed at their boiling points with correspondingly longer reaction periods or lower yields. The vapor pressure of the solvent at the reaction temperature is in itself irrelevant to the success of the reaction, but a boiling solvent maintains a desired reaction temperature in a convenient way.

The hydrogenation of the triple bond in the intermediate product may be carried out in any conventional manner. Hydrogenation at ambient temperature and low pressure is preferred. The platinum group elements and platinum oxide are typical of suitable catalysts.

The following examples are further illustrative of our invention, and it will be understood that the invention is not limited thereto:

Example 1

A suspension of 80.5 grams (0.5 mole) 4-hydroxycoumarin, 66 grams (0.55 mole) phenylethynylcarbinol, 50 milliliters phosphorus oxychloride, and 2,000 milliliters chloroform were refluxed fifteen hours, and the reaction mixture was then cooled to room temperature. The solvent phase was separated from an insoluble oily residue, washed thoroughly with water, and was then extracted with 2,000 milliliters 2-normal sodium hydroxide solution in several batches. The alkaline aqueous extract was acidified with 2 N hydrochloric acid to pH 1 whereupon a precipitate was formed. It was recrystallized from a mixture of toluene and ligroin and had a melting point of 145° C. The yield in several runs was between 92 and 105 grams (70 to 80% on the basis of the 4-hydroxycoumarin used). The crude precipitate may also be recrystallized from water/methanol.

The product was identified as 3-(1-phenyl-2-propynyl)-4-hydroxycoumarin having the formula

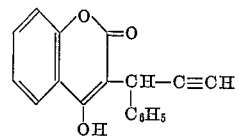

Example 2

26.2 grams (0.1 mole) of the 3-(1-phenyl-2-propynyl)-4-hydroxycoumarin obtained by the method of Example 1 were dissolved in 200 milliliters methanol and were hydrogenated at ambient temperature in the presence of 0.5 gram of a catalyst consisting of palladium on a calcium carbonate carrier in a closed reaction bottle mounted on a shaker mechanism until the absorption of gaseous hydrogen by the reaction mixture was completed. The catalyst was then removed by filtration, the clear filtrate was heated to its boiling point, and enough water was added to cause permanent turbidity. When the turbid solution was permitted to cool to room temperatures, crystals of 3-(1-phenylpropyl)-4-hydroxycoumarin were precipitated in an almost theoretical yield. The product had a melting point of 176°–178° C. and was identical with the known pure product which has a melting point of 177°–178° C.

While the invention has been described with particular reference to specific embodiments, it is to be understood that it is not limited thereto, but is to be construed broadly and restricted solely by the scope of the appended claim.

What we claim is:
3-(1-phenyl-2-propynyl)-4-hydroxycoumarin.

References Cited by the Examiner
UNITED STATES PATENTS 2,952,689  9/1960  Enders et al. _____ 260—343.2
3,022,317  2/1962  Ziegler et al. _____ 260—343.2

OTHER REFERENCES

Fieser et al., Advanced Organic Chemistry, Reinhold Pub. Corp., New York (1961), pages 176, 177, 229.
Sethna et al., Chemical Reviews, vol. 36, No. 1 (February 1945), pages 41 and 42.

WALTER A. MODANCE, *Primary Examiner.*
JAMES A. PATTEN, *Assistant Examiner.*